(12) United States Patent
Elliot (10) Patent No.: US 7,242,776 B1
(45) Date of Patent: Jul. 10, 2007

(54) METHOD AND APPARATUS FOR THE GENERATION AND DISTRIBUTION OF RANDOM BITS

(75) Inventor: Brig Barnum Elliot, Arlington, MA (US)

(73) Assignees: Verizon Corporate Services Group Inc., New York, NY (US); Level 3 Communications, LLC, Broomfield, CO (US); BBN Technologies Corp., Cambridge, MA (US)

( * ) Notice: Subject to any disclaimer, the term of this patent is extended or adjusted under 35 U.S.C. 154(b) by 1428 days.

(21) Appl. No.: 09/634,416

(22) Filed: Aug. 8, 2000

(51) Int. Cl.
*H04L 9/00* (2006.01)

(52) U.S. Cl. .................. 380/278; 380/279; 705/65; 705/67; 713/190; 713/150; 708/250

(58) Field of Classification Search .............. 380/46, 380/28, 43, 278, 251, 3, 4, 8, 9; 708/250, 708/3, 2; 713/168, 182, 189; 705/40, 44; 463/22, 16

See application file for complete search history.

(56) References Cited

U.S. PATENT DOCUMENTS

| | | | | |
|---|---|---|---|---|
| 5,530,749 | A * | 6/1996 | Easter et al. ............... 713/191 |
| 5,563,946 | A * | 10/1996 | Cooper et al. ............... 705/56 |
| 5,627,775 | A * | 5/1997 | Hong et al. ................ 708/250 |
| 5,677,953 | A * | 10/1997 | Dolphin ...................... 705/51 |
| 5,732,137 | A * | 3/1998 | Aziz ......................... 713/155 |
| 6,014,650 | A * | 1/2000 | Zampese ..................... 705/44 |
| 6,195,669 | B1 * | 2/2001 | Onodera et al. .............. 708/3 |
| 6,212,280 | B1 * | 4/2001 | Howard et al. ............ 380/279 |
| 6,236,981 | B1 * | 5/2001 | Hill .......................... 705/67 |
| 6,286,050 | B1 * | 9/2001 | Pullen et al. .............. 709/229 |
| 6,324,558 | B1 * | 11/2001 | Wilber ....................... 708/255 |
| 6,456,984 | B1 * | 9/2002 | Demoff et al. ............... 705/40 |
| 6,563,514 | B1 * | 5/2003 | Samar ........................ 715/711 |
| 6,581,078 | B1 * | 6/2003 | Liardet ...................... 708/250 |
| 6,684,333 | B1 * | 1/2004 | Walker et al. .............. 713/168 |
| 6,792,438 | B1 * | 9/2004 | Wells et al. ................ 708/250 |
| 6,868,495 | B1 * | 3/2005 | Glover ....................... 713/190 |

OTHER PUBLICATIONS

Paul Cassel; WIN 98 Chapter 3—Navigating Within Windows 98; Computer Books Online; copyrighted 1998-2004; "http://www.computerbooksonline.com/chapters/win/9821.htm"; pp. 1-23.*

Amit Singh; Many Systems on a PowerBook: Windows; copyrighted 1994-2005; "http://www.kernelthread.com/mac/vpc/win.html"; pp. 1-11.*

* cited by examiner

*Primary Examiner*—Nasser Moazzami
*Assistant Examiner*—Carl G. Colin (57) ABSTRACT

A system (100) and method for the production and distribution of random bits is disclosed. The system uses a truly random source (102) to generate random data. The random data is sent to an input interface (104), which converts the random data to a random bit stream. The random bit stream is coupled from the input interface (104) to a processor (106) via bus (109). The processor (106) executes instructions received from memory (110) and converts the random bit stream into a machine-readable format. The machine-readable random bit stream is sent to network connection (108) and made available to network (112). A remote user (114) requests a random bit stream from system (100) over network (112). System (100) sends the requested number of random bits to the remote user (114). System (100) can include other functionality such as accounting procedures, error checking, user authorization, and data archiving to further enhance operation and aid in conducting business involving the production and distribution of random bit streams.

19 Claims, 7 Drawing Sheets

METHOD AND APPARATUS FOR THE GENERATION AND DISTRIBUTION OF RANDOM BITS

FIELD OF THE INVENTION

The invention relates generally to random bit generation, and more particularly to the generation and distribution of truly random bits over a communications network.

BACKGROUND OF THE INVENTION

Many computerized applications such as encryption algorithms, scientific models, and analytical tools require random numbers. The most common approach for generating random numbers involves using a software algorithm. To generate random numbers, the algorithm uses a starting value, referred to as a seed. The seed is then manipulated using complex processing algorithms to yield a result. While software algorithms provide a readily available and inexpensive means for generating random numbers, software algorithms have shortcomings.

The most severe shortcoming arises from the use of a seed value which is not a truly random number. The use of a non-random seed injects a starting bias into the algorithm. The complex processing used to manipulate the seed also imparts a bias, and the result is a number that is not truly random. For example, if two random number generating software algorithms are run against each other using different seeds, the output of the algorithms will tend to converge on the same final result over time. The convergence towards a common value for both algorithms is known as a biased, or non-random, result. The name given to the biased output of a random number generating software algorithm is "pseudo random number", hence these algorithms are more properly referred to as pseudo random number generators (PRNGs). An additional shortcoming of PRNGs is that they require computational resources and memory. Memory is required to store the complex processing algorithms, seed, interim results, and the resulting pseudo random number (PRN). Computational resources, in the form of microprocessor operations, are required to manipulate the seed in order to arrive at a PRN.

Since a pseudo random number has a bias, predicting its value, and the value of any quantity derived from it, is much easier than predicting the value of a truly random number. When pseudo random numbers are used to create encryption keys for computerized communications, the resulting key is easier to crack. If an intruder cracks an encryption key, the intruder has access to all of the previously encrypted data. When pseudo random numbers are used to validate scientific experiments, their bias can lead to errors.

Because of the shortcomings associated with PRNGs, it is preferable to use truly random numbers for applications requiring random numbers. A truly random number is one in which the present value is not dependent upon, nor related to, the value of any other number in the sequence; that is, the present value of the number is determined only by unbiased chance. If the value of the number is unbiased, then the likelihood that a particular number will appear will not change over time; in other words, it will always be unpredictable. For example, if a truly random process can have an output value of zero or one, then the probability of the number being a one at any given instant in time should be equal to 0.5. In addition, the present output value should be uncorrelated, i.e. it should not be dependent upon, nor related to, a previous value of the output.

Truly random numbers are difficult and costly to obtain. The difficulty arises because random numbers are normally obtained by sampling truly random processes. Truly random processes come from a limited number of physical activities, or phenomena. Examples of commonly used random processes are radioactive decay, electronic (Johnson) noise, or unstable oscillators. Since random physical processes are analog, they must be sampled to convert them into a digital form useable by computer applications. Care must be exercised when sampling random processes so that sampling biases are not introduced into the digitized data. If sampling biases are introduced into the sampled data, the truly random nature of the sampled process will be destroyed.

The costs and complexity associated with maintaining and properly sampling random physical processes, such as the decay of radioactive elements, prevent many would-be users of random numbers from having access to them. As a result, pseudo random numbers are used, resulting in computerized encryption algorithms that are easier to crack and scientific experiments that are more difficult to validate.

There is presently a need for a low cost and reliable source of truly random data capable of use in computer applications. The source of random data should be such that each user does not have to incur the expense of maintaining and properly sampling a truly random process. In addition, the source of truly random data should allow collaborating users to access the same truly random number as a starting point for their applications. In addition, the source of random data should be configurable so that random numbers can be securely distributed to authorized users without eavesdroppers gaining access to the data. Furthermore, the source for truly random data should be capable of accounting for random data sent to a particular user to facilitate record keeping.

SUMMARY OF THE INVENTION

The invention allows networked users access to truly random bit streams of varying size without requiring the maintenance of special hardware or software. Furthermore, the invention sends the same random bit stream to a plurality of remote users to facilitate secure communication and scientific collaboration. Alternatively, unique sequences of random bits can be sent to respective users. The disclosed invention also provides for archiving random bits and billing users for the random bits they receive.

The system for producing and distributing random bits accepts data from a truly random source, for example a decaying radioactive substance or thermal noise. The data from the random source is inputted to an input interface of the system. The random source can have analog-to-digital conversion associated therewith, such that a serial digital bit stream is sent to the input interface. Alternatively, the system itself can perform the analog-to-digital conversion, in which case an analog random source output is inputted to the input interface of the disclosed system.

The input interface accepts the random data stream from the random source by way of an input connection. The input interface converts the random source data to a random bit stream. The random bit stream is then sent to a processor for converting the random bit stream into a machine-readable form. A memory is coupled to the processor and is used for controlling the processor so that the random bit stream is properly converted into machine-readable form. Next, the processor sends the machine-readable bit stream to a network connection. A bus communicatively connects, and supplies power to, the input interface, processor, memory, and network connection. The network connection makes the machine-readable random bit stream available to a network. The network can be of any type such as Internet, public switched telephone, wireless RF, optical, or the like.

The disclosed invention is normally implemented on a general-purpose computer server, but specialized random bit distribution systems can be built if desired. In an alternative embodiment, the invention can be implemented on several computers that are geographically distributed and communicatively connected to each other. A distributed configuration has the advantage of providing redundancy if one of the random bit servers goes down, and it provides load sharing during periods of high demand to ensure timeliness of service.

An additional feature of the system includes the use of accounting routines for tracking and billing user accounts. Additionally, machine-readable random bit streams can be protected by encrypting and encapsulating them in communication protocols to prevent eavesdroppers from interpreting or altering the random bit streams. Firewalls can be employed to protect the random bit source, and user confirmations can be employed to ensure that the random bit stream is received by an authorized party. Additional features of the invention will be discussed below and others will be apparent to the reader without departing from the spirit of the disclosed invention.

DETAILED DESCRIPTION OF THE INVENTION

The following detailed description of implementations consistent with the present invention refers to the accompanying drawings. The following detailed description does not limit the invention. Instead the scope of the invention is defined by the appended claims.

Systems and methods consistent with the present invention provide a random source to generate a random bit stream that is made available on a network. In an embodiment of the invention, the random source is truly random such that two subsequent output values of the random source are completely uncorrelated irrespective of the time interval over which they are taken. Examples of random sources that can be used with the disclosed system include, but are not limited to, the elapsed time between emissions of particles during radioactive decay, thermal noise from a resistor or semiconductor diode, frequency instability of a free running oscillator, and random pressure fluctuations within a sealed disk drive caused by the air turbulence of the spinning disk, etc. In addition, other commercially packaged random sources are available, such as Intel's Random Number Generator™ or pseudo random sources, but they are not preferred for applications requiring truly random bit streams. Truly random sources are well known in the art and many methods exist for converting them to digital signals, therefore they will not be discussed in detail.

To aid the reader in understanding the disclosed system and method, a random source comprised of electronic noise will be used through out the ensuing detailed description of preferred embodiments. The random source described herein is similar to the one disclosed in U.S. Pat. No. 5,627,775 Method and Apparatus for Generating Random Numbers Using Electrical Noise. Here it is noted that the use of electronic noise and the associated timing and conversion circuitry are not intended to limit the scope of the invention.

Exemplary Embodiment

Figure 1:
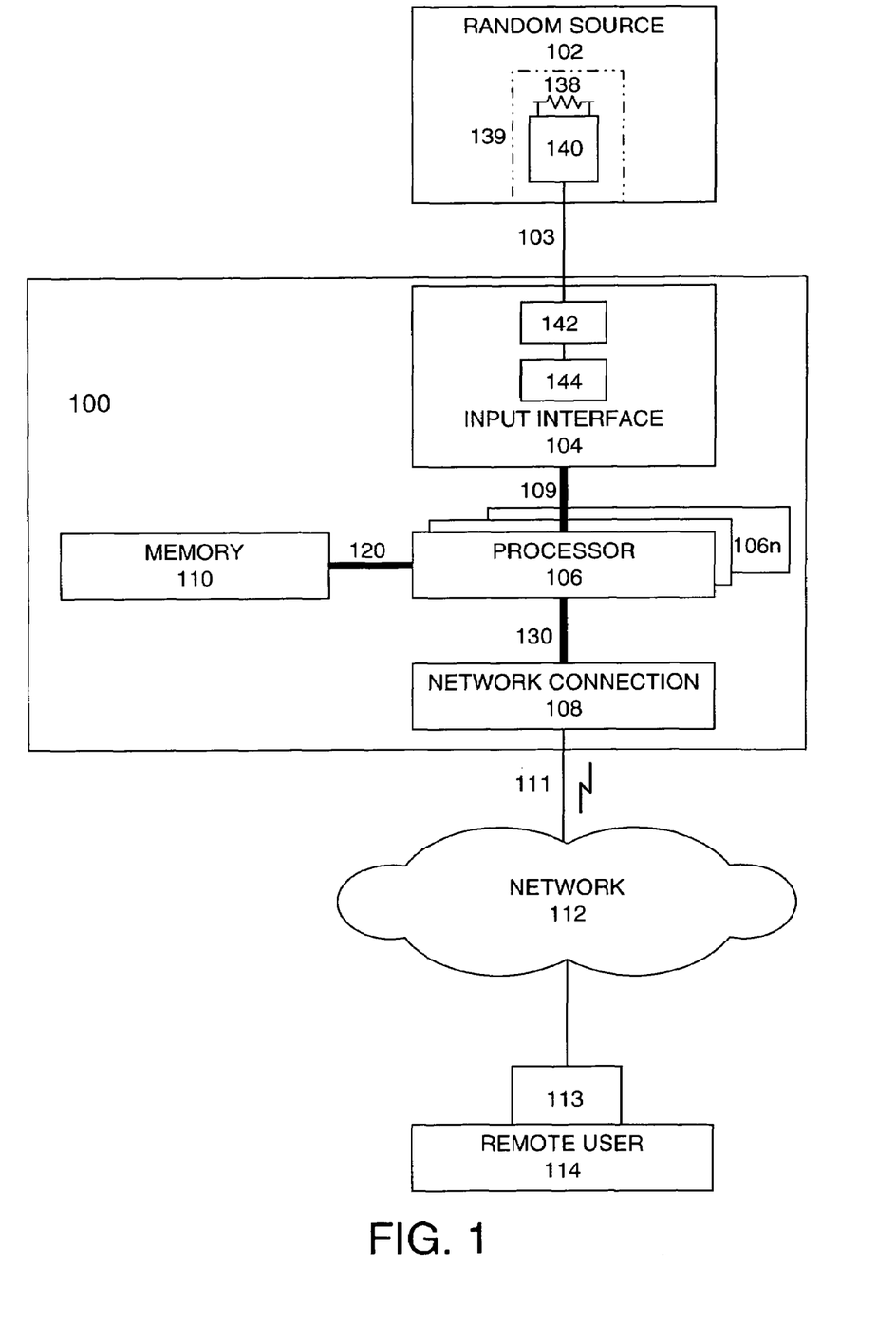
FIG. 1—illustrates a system for generating and distributing random bits to a remote user.

FIG. 1 illustrates an embodiment of the present invention for distributing random bits, hereinafter referred to as system 100. System 100 is normally implemented as a general purpose computer running specialized software such that it operates as a random bit server connected to a network 112. The architecture for the general purpose computer is presented in greater detail under a separate heading in conjunction with FIG. 3. A random source 102 contains a physical process that produces truly random data. The random source 102 illustrated in FIG. 1 is comprised of electronic noise obtained from an unloaded resistor 138. The random source 102 can be configured with, or without, analog-to-digital conversion components. If random source 102 is equipped with analog-to-digital conversion, then the digital output will be supplied to an input interface 104. On the other hand, if the output of the random source 102 is analog (as shown in FIG. 1 for illustrative example), then the analog-to-digital conversion will be performed by input interface 104. An input connection 103 is used to connect the random source 102 to input interface 104. Input connection 103 is normally comprised of wires; however, other connection means can be used such as optical fibers or wireless links.

In FIG. 1, random source 102 is comprised of Johnson noise present across the leads of a resistor 138. The Johnson noise is connected to an analog circuit module 140. The analog circuit module 140 amplifies the Johnson noise to useable amplitudes, typically on the order of 10,000 times. Analog circuit module 140 also biases the output of the amplifier around a baseline voltage. Additionally, the baseline voltage is chosen such that it is midway between the average minimum and average maximum voltage amplitudes of the Johnson noise. The baseline voltage should be chosen such that the amplified noise signal is above the baseline 50% of the time and below the baseline 50% of the time. Zero volts is often selected as the baseline level, and capacitive coupling is employed to eliminate any DC bias present on the Johnson noise signal.

Resistor 138 and analog circuit module 140 are located within a shielded enclosure 139 to eliminate electromagnetic interference (EMI) which, if present in the environment surrounding random source 102, can destroy the truly random nature of the Johnson noise. In addition, power leads to analog circuit module 140 or resistor 138 are capacitively coupled to help prevent EMI coupling. The output of the analog circuit module 140 is connected to an input interface 104 using input connection 103.

Input interface 104 converts the random analog data into a random bit stream. In the embodiment of FIG. 1, input interface 104 is comprised of a synchronization circuit 142 and a digital circuit 144. Synchronization circuit 142 receives the amplified Johnson noise signal from analog circuit module 140 and synchronizes it with an internally generated clock signal. The internally generated clock signal is created using a standard crystal oscillator or other means known in the art. The synchronized noise signal and clock signal are outputted as a noise-clock signal to digital circuit 144. Digital circuit 144 uses the noise-clock signal as a random trigger to sample data from a free running multi-state module. As the multi-state module cycles through its states, the noise-clock signal specifies when to sample the multi-state signal. For example, digital circuit 144 can be biased to take a sample when the noise-clock signal is above zero volts. If proper biasing has been maintained, then the noise-clock signal should be above zero volts one-half of the time. The result is that digital circuit 144 is randomly sampled such that the output is a random series of bits with a random spacing. The random bit stream present at the output of digital circuit 144 is then made available to a processor 106 via a hardware connection such as bus 109.

Typically, the output of the input interface 104 will be made available to bus 109 in one of two ways, although other methods known in the art can be employed. First, input interface 104 may be address-mapped to bus 109. In the address-mapped embodiment, input interface 104 appears to be a region of memory in system 100. Using the address-mapped approach, input interface 104 is read every time its corresponding memory location is read. To read the memory location corresponding to input interface 104, processor 106 executes a normal memory read instruction designating the address of input interface 104. When the memory location is read, the random bit presently available at the output of the input interface 104 will be read. The second commonly employed method for reading random bits from input interface 104 employs an I/O approach. The I/O approach is similar to the address-mapped approach previously described; however, processor 106 uses a special instruction to read random bits from input interface 104, rather than a typical memory read employed in the address-mapped approach.

Buffering is normally employed at the output of input interface 104 to ensure that a sufficient supply of random bits are available at the output of input interface 104. Normally, the buffer will be implemented as a ring buffer, or circular buffer, on input interface 104. The digitized output of random source 102 is written into the ring buffer. Random bits are read from the ring buffer when processor 106 makes a request using the address-mapped or I/O approach. When a random bit is read from input interface 104, it is sent over bus 109 to processor 106. Employing a ring buffer has the advantage of holding random bits in a buffer until processor 106 requests them. This allows system 100 to be configured so that processor 106 can sleep when random bits are not required, and then wake up and read available random bits from the buffer when a user request is received. Additionally, processor 106 can read buffered random bits from the ring buffer as fast as the processor and bus speed will allow. Employing buffering allows the generation of random bits by the random source 102, to be decoupled from the rate at which they are read by processor 106. The size of the ring buffer is selected based on the speed of random bit generation by the random source and the estimated remote user load. Quickly reading stored values when needed, enables the random bit server to respond to periods of high demand without degrading service to remote users 114.

Processor 106 converts the random bit stream into a machine-readable random bit stream. A machine-readable bit stream is one that has been formatted such that it is readily useable by a remote user terminal 114. The formatting performed by processor 106 may entail assembling the random bits into uniform word lengths, providing error detection and correction, adjusting the amplitude of the random bit stream, etc. Typically, processor 106 will be a digital microprocessor; however, it can take other forms such as a field programmable gate array (FPGA), etc. In addition, processor 106 can be comprised of multiple processors 106$n$ for specialized applications such as high bandwidth delivery of random bits.

In an embodiment, processor 106 can be configured to perform its task as follows. Processor 106 wakes up to perform a read of random bits from input interface 104. A harvester task is executed in processor 106 to perform the read operation. When the harvester task is executed, it reads a batch of random bits from input interface 104. The size of the batch is selectable using system configuration parameters defined by a system operator. The harvester task then appends the present batch or random bits to a disk file. Disk files are chosen to be a given size based on system parameters such as system memory and user demand. An open disk file contains the present stream of random bits. The harvester task reads additional random bits into the open disk file until the pre-defined size of the disk file is reached. When the disk file limit is reached, the harvester task closes the present disk file and opens a new one. Closed disk files are saved to memory, typically a magnetic disk drive, optical storage media, or the like.

The saved disk files are used to supply random bits to remote users. A given user only receives the number of bits requested, and an open disk file will be used until its contents are exhausted. When empty, the disk file is deleted from memory. If a user request cannot be filled by an open disk file, a subsequent disk file will be opened to provide random bits that were not available in the original open disk file. Employing disk files enables the random bit server to store and organize random bits in an efficient manner. Using disk files once and then discarding them ensures that the same random bit is not used twice. Additionally, if it is determined that some bits within a disk file are corrupted, the disk file can be discarded without slowing down the response time of the random bit server 100.

Processor 106 is also used to execute a statistics checking routine for ensuring that delivered random bits are truly random. The statistics checking routine is invoked periodically by the host computer (system 100) operating system. When executed, the statistics checking routine performs statistical tests on the newest disk files saved to memory. The statistics checking routine employs one or more statistical tests known in the art to ensure that distributed random bit streams are unbiased. The statistics checking routing accomplishes its functions as follows. First, the statistics checking routine determines how many new files must be checked. Next, the statistics checking routine checks each disk file one at a time. If a problem is detected within a disk file, that file is withdrawn from the queue of available disk files for users. The withdrawn disk file is flagged and moved to a diagnostics section of memory. Files placed in the diagnostic section of memory are never available to users. The diagnostics section of memory will perform additional testing on the flagged disk file to determine the source of the problem. A system operator notification is also initiated. The system operator notification informs the system operator that there is a problem requiring intervention.

Processor 106 also executes a download task. The download task is executed whenever a user requests a stream of random bits through the network. A preferred method for accomplishing the download task is through a web server. If a web server is used, a remote user 114 communicates with the web server using a web client when random bits are desired. The user's request identifies the number of bits required and any special formatting requirements. To fulfill the user request, the download task reads the desired number of bits from the available disk files containing random bits. Available disk files are ones that have been statistically verified for the randomness of their contents. If a user request exhausts the number of random bits available in the disk file presently open, then the download task deletes the empty disk file and opens the next one in the download queue. Employing a plurality of disk files has the effect of making an endless number of random bits available to users. Although the download task and random bit server have been described as a web server, the invention can be implemented in many other ways known in the art.

A memory 110 is connected to processor 106 by bus 120. Memory 110 provides processor 106 with the instructions necessary to properly format the random bit stream into a machine-readable random bit stream as previously described. Memory 110 is normally external to processor 106, although it can reside on processor 106 if desired. Processor 106 is also connected to a network connection 108 by bus 130. Memory 110 is also used to archive random bit streams when required. If system 100 performs statistical analyses on random bit streams, then memory 110 will store the statistical algorithms and results. Additionally, memory 110 stores accounting information and user identification information, such as passwords, as needed. Memory 110 can take many forms, for example it can be comprised of RAM, SRAM, magnetic disk media, optical media, etc.

Network connection 108 receives a machine-readable random bit stream of the desired length from processor 106 and makes it available to a network 112 via output connection 111. Output connection 111 normally consists of conductors; however, it can take other forms such as optical fibers, wireless links, or the like. Network connection 108 is normally embodied as a network interface card such as an Ethernet card, Fiberoptic Distributed Data Interface (FDDI) card, wireless LAN card, modem card, or Asynchronous Transfer Mode (ATM) card; however, other types of network connections can be employed. Additionally, network connection 108 can be a stand-alone component, or alternatively, network connection 108 can be integrated with other components such as processor 106 or input interface 104. When formatting data for network transport, network connection 108 encapsulates the random bit stream with necessary header information, error detection information, encryption deciphering information, compression/decompression information, and network protocol information. In a preferred embodiment, the random bit server is configured as a web server. As such, the system is configured to use the standard protocols for web interactions. Normally, the web server will be running the HTTP protocol running over the TCP/IP protocol suite. The HTTP and TCP/IP configuration has the advantage that it is inexpensive and easy to implement. In addition, the TCP connection guarantees that random bits will reach the client without loss or corruption.

There are a number of other network implementations known in the art that can be used with the disclosed invention, a few of the popular ones will be described here. One implementation uses the Real Time Protocol (RTP) instead of TCP. RTP is designed to deliver continuous, or streaming, content from one computer to another across a network. The advantage of RTP is that is provides a flow of data at a relatively constant rate. For some applications, such as when a user needs a steady stream of random bits, RTP will be beneficial. In applications, where guaranteed delivery of the random bits are required, TCP is a better choice because RTP does not guarantee delivery. Another network implementation uses IP multicast. IP multicast is useful for applications where a single sender wants to send data to multiple recipients. For example, IP multicast is desirable for providing the same set of random data to multiple parties collaborating on a common project. For particular applications, the random bit server can employ other network protocols such as experimental high reliability multicast protocols. Additionally, multiple protocols can be combined to achieve the desired level of service and reliability.

Typically, a remote user 114 initiates a request for a stream of random bits of a specified length, e.g. a user may ask for a stream that is 128 bits in length. The remote user's request is communicated to system 100 by network 112. In most cases, network 112 will be an Internet Protocol network; however, network 112 can take many other forms and use many other protocols known in the art such as a Local Area Network (LAN), Wide Area Network (WAN), Synchronous Optical Network (SONET), Virtual Private Network (VPN), etc. When a remote user's request is received at system 100, a specified number of random bits are sent over network 112 to remote user 114. The random bit generator can create random bit streams of any desired length; however, some network protocols will partition the data into packets of fixed (e.g. with ATM) or variable length. If a packet type of network is used, a network interface 113 at a remote user's location will reassemble the random bit sequence into the proper format for usage by a remote user 114.

Exemplary Method for Distributing Random Bits

Figure 2:
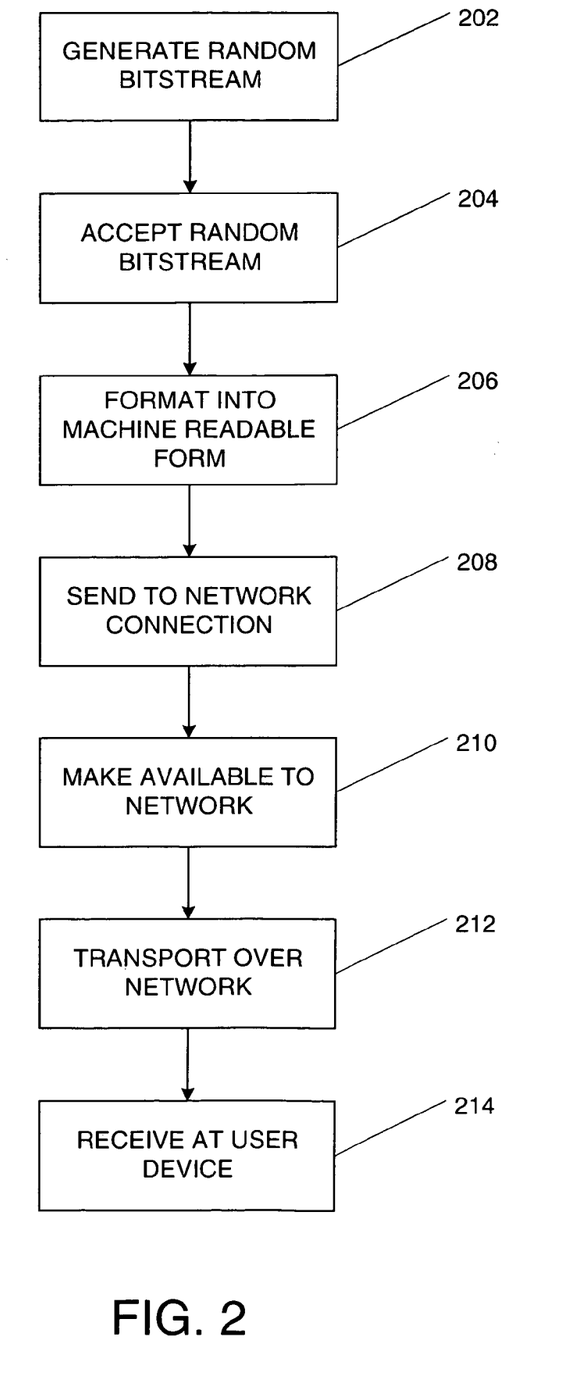
FIG. 2—presents a method for generating and distributing random bits to a user.

FIG. 2 illustrates a method for distributing random bits to a user. A random bit stream is generated by a random source 102 (step 202). In step 204, the input interface 104 accepts the random bit stream from random source 102 and makes it available to processor 106. As previously discussed, input interface 104 can employ a ring buffer to ensure that a sufficient number of random bits are available for processor 106. Processor 106 formats the random bit stream into a machine-readable format (step 206). Step 206 will normally include execution of the harvester task, the statistics checking task and the download task. After the random bit stream is in the proper machine-readable format, it is sent to network connection 108 (step 208). Next, the properly formatted random bit stream is made available to the network 112 (step 210). The random bit stream is transported from system 100 to the remote user 114 using the selected network protocol and the associated hardware infrastructure of network 112 (step 212). Normally network 112 will be a publicly available network such as the Internet; however, the invention can also be used with private networks such as a corporate local area network (LAN), or a university LAN. When the random bit stream is received by the remote user 114 it is available for use in a remote user's application (step 214).

Often, remote user 114 will use the random bit stream locally; however, remote user 114 can send the random bit stream to other locations using network 112 or via another means selectable by the remote user 114. Additionally, a remote user 114 can archive the random bit stream for later use or for transport to another device.

Exemplary Architecture for Practicing Invention

Figure 3:
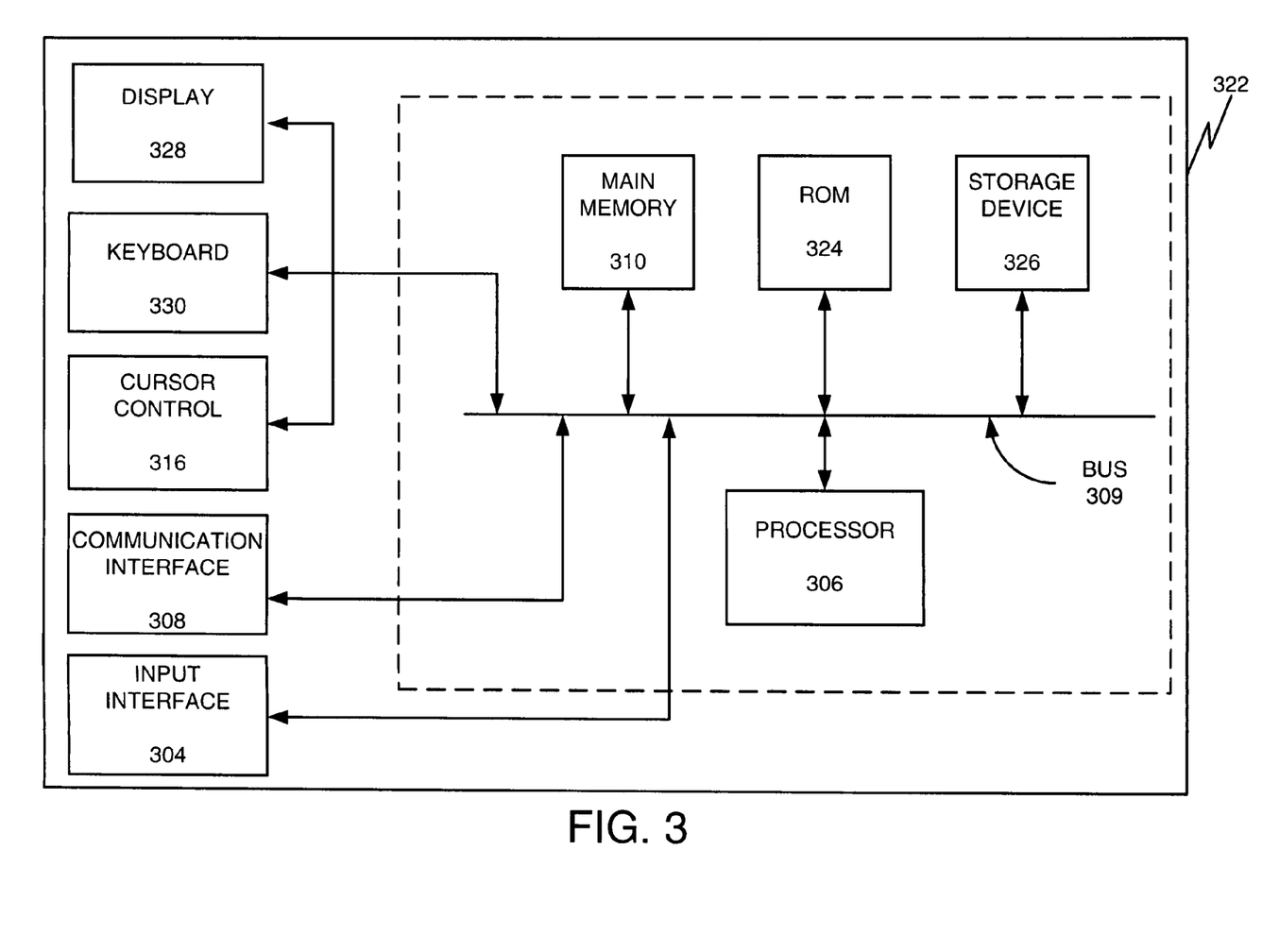
FIG. 3—illustrates a general purpose computer capable of generating and distributing random bits.

FIG. 3 illustrates system 100 in more detail as implemented on a general-purpose computer 322. In FIG. 3, the exemplary computer 322 includes a processor 306, a main memory 310, a read only memory (ROM) 324, a storage device 326, a bus 309, a display 328, a keyboard 330, a cursor control 316, a communication interface 308, and an input interface 304.

Processor 306 may be any type of conventional processing device that interprets and executes instructions. Main memory 310 may be a random access memory (RAM) or a similar dynamic storage device. Main memory 310 stores information and instructions to be executed by processor 306. Main memory 310 may also be used for storing temporary variables or other intermediate information during execution of instructions by processor 306. ROM 324 stores static information and instructions for processor 306. It will be appreciated that ROM 324 may be replaced with some other type of static storage device. The data storage device 326 may include any type of magnetic or optical media and its corresponding interfaces and operational hardware. Data storage device 326 stores information and instructions for use by processor 306. Additionally, data storage device 326 can store disk files containing machine-readable random bits. Bus 309 includes a set of hardware lines (conductors, optical fibers, or the like) that allow for data transfer among the components of computer 322.

Display device 328 may be a cathode ray tube (CRT), or the like, for displaying information to a system operator. The keyboard 330 and cursor control 316 allow the system operator to interact with the computer 322. The cursor control 316 may be, for example, a mouse. In an alternative configuration, the keyboard 330 and cursor control 316 can be replaced with a microphone and voice recognition software to enable the system operator to interact with the computer 322.

Communication interface 308 enables computer 322 to communicate with network 112. Here it is noted that communication interface 308 can also be used to allow computer 322 to communicate with other devices/systems via any communications medium. For example, communication interface 308 may be a modem or an interface to a radio frequency (RF) network.

As will be described in detail below, a computer 322 consistent with the present invention provides a system operator with the ability to distribute random bits to a remote user 114 over the network 112. The computer 322 performs operations necessary to complete the desired action in response to processor 306 executing sequences of instructions contained in, for example, memory 310. Such instructions may be read into memory 310 from another computer-readable medium, such as a data storage device 326, or from another device via communication interface 308. Execution of the sequences of instructions contained in memory 310 cause processor 306 to perform the method that was described previously and will be further elaborated on hereafter. Alternatively, hard-wired circuitry may be used in place of, or in combination with, software instructions to implement the present invention. Thus, the present invention is not limited to any specific combination of hardware circuitry and software.

Distributed Production of Random Bits

Figure 4:
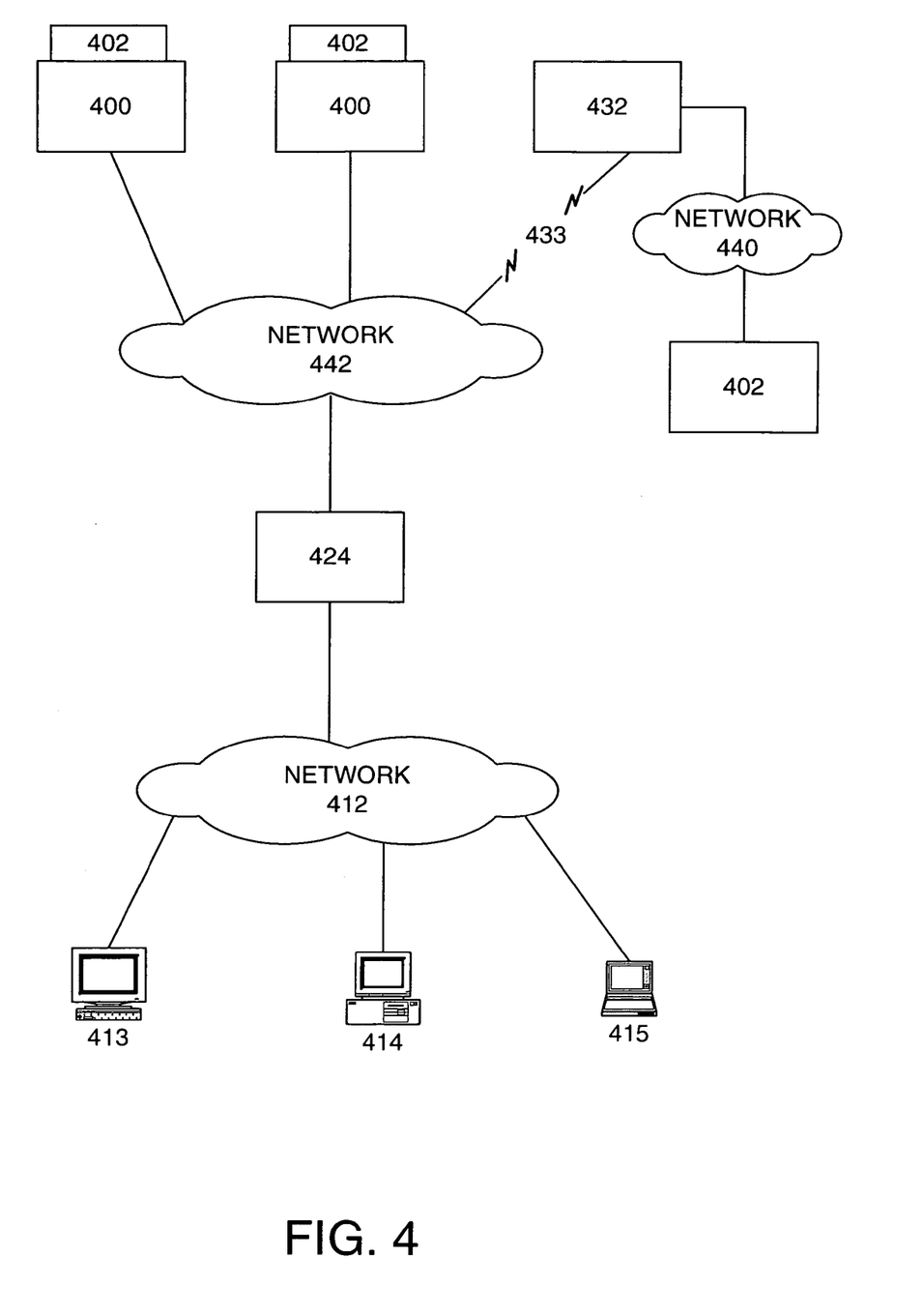
FIG. 4—illustrates a system for generating and distributing random bits comprised of a plurality of random sources.

FIG. 4 illustrates a distributed system for generating and distributing random bits. In FIG. 4, the generation of random bits is accomplished using several distributed sources. Two systems are configured similarly to the system illustrated in FIG. 1, with each comprising a random source 402 locally connected to a system for distributing random bits 400. The output of each system 400 is connected to network 442. Network 442 will normally be an Internet network; however, other types of networks and protocols can be used. FIG. 4 also shows a remotely located random source 402, which is connected via network 440 to a general-purpose computer 432, configured for distributing random bits. It is noted that network 440 can be isolated from network 442, or the information from random source 402 can be communicated to system 432 over network 442. The output of the general-purpose computer 432 is connected to network 442 via wireless link 433. Wireless link 433 will normally be a digital packet network, but analog radio links can also be used. Network 442 carries the random bits to a random bit server 424. The random bit server 424 is similar to system 400, but it employs additional software instructions for properly formatting and synchronizing random bit streams arriving from a plurality of random bit sources into a single random bit stream for distribution across network 412. In addition, the random bit server 424 includes the capability for performing additional functions such as remote user authentication, accounting for bit usage, archiving random bit streams, error checking, etc.

The output of random bit server 424 is connected to a plurality of remote users, here denoted with workstation 413, computer 414 and laptop 415 using network 412. Although network 412 is shown as a separate network, the random bit streams can be sent to the remote users 413, 414, and 415 over the same network used for connecting the random sources 402 to the random bit server 424. An Internet network will normally be used to connect random bit server 424 to remote users 413, 414 and 415, but other network types can be used. In addition, networks 412, 442, and 440 can be wireline, optical, wireless, etc.

Exemplary Method for Practicing Invention

Figure 5:
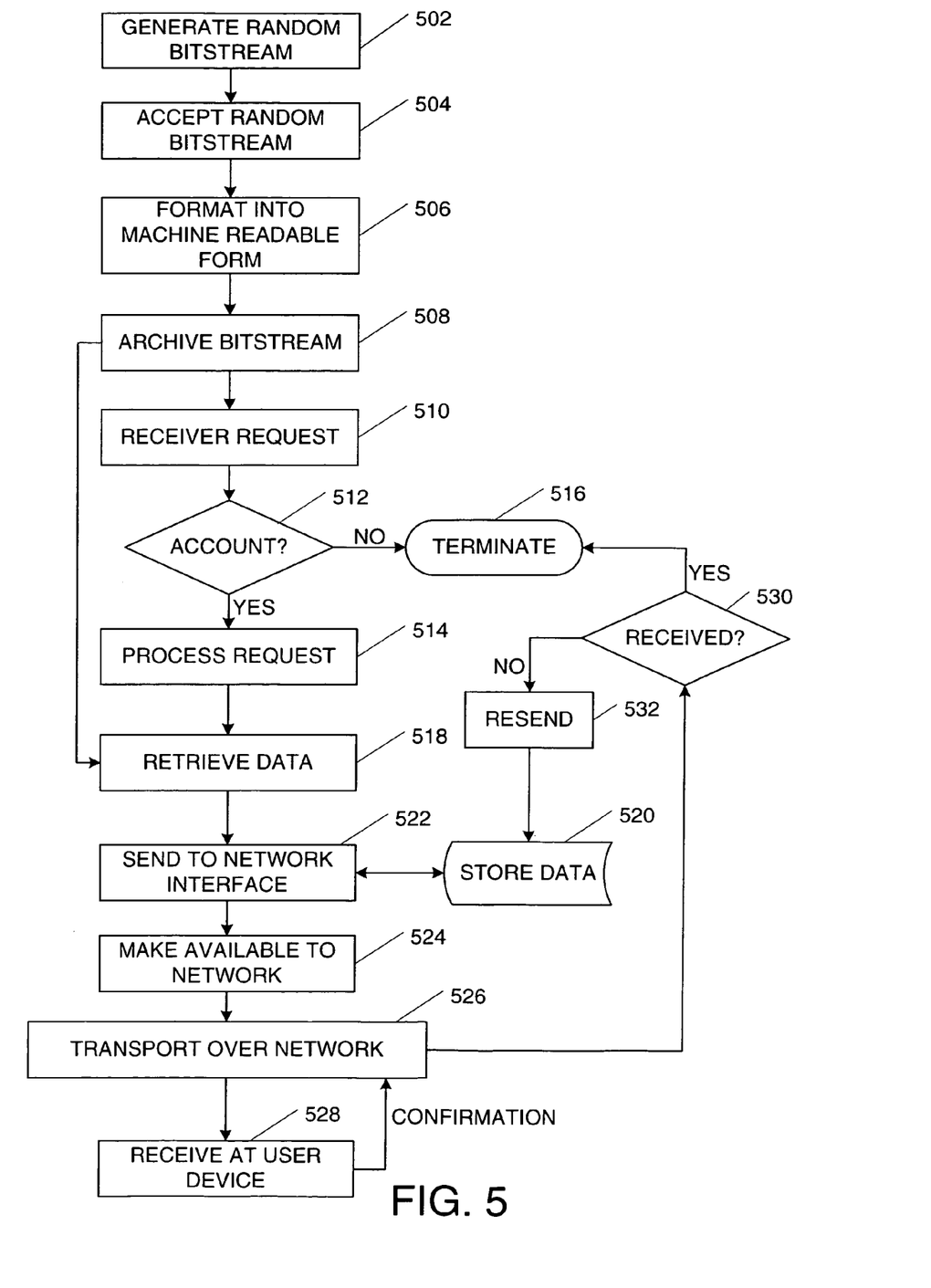
FIG. 5—presents a method for generating and distributing random bits.

FIG. 5 illustrates a method employing additional activities intended to enhance system usability and reliability. A random source 102 generates a random bit stream (step 502). The random bit stream is accepted by the input interface (step 504). Next, input interface 104 makes the random bit stream available to processor 106. Processor 106 formats the random bit stream into a machine-readable format acceptable for encapsulation into a transmittable format by network connection 108 (step 506). Normally, statistical analyses are performed on the random bit streams in step 506. The machine-readable random bit stream, available at the output of processor 106, is then archived to storage device 326 as disk files (step 508).

A remote user 114 initiates a request for a number of random bits (step 510). System 100 then determines if remote user 114 has a valid user account (step 512). When remote user 114 has a valid account, then the user's request is processed (step 514). If the user does not have an account, the session is terminated (step 516). In some instances system 100 will be set up so that remote user 114 has a prepaid account balance. If a prepaid account balance is used, then the cost of the random bit stream is deducted from the remote user's account. In other cases, the payment for random bits can be accomplished using a credit card, account transfer, or other electronic payment means.

As part of processing the request, the necessary number of random bits is retrieved from storage (step 518). The retrieved bit stream is then sent to network connection 108 (step 522); in addition, the retrieved bit stream is indexed and stored with reference to the remote user's account information (step 520). The retrieved bit stream is stored before being sent over network 112 in case the information must be resent due to a network error or equipment failure. After storing the retrieved data, the random bit stream is made available to network 112 (step 524). Network 112 carries the random bit stream to remote user 114 using a selected network protocol (step 526). The requested bit stream is delivered to the remote user's computer 114 via network 112 (step 528).

The remote user's computer 114 then sends a confirmation back to system 100 (step 528). The confirmation is sent back to system 100 over the same network 112 used to carry the requested bit stream to remote user 114. The confirmation serves two purposes. First, system 100 uses it to ensure that the random bit stream arrived at the remote user's computer 114 without corruption (step 530). Second, it prevents remote user 114 from claiming they did not receive the requested bit stream. When system 100 checks the confirmation it determines if the requested bit stream was delivered in tact. If it was, then the session is terminated (step 516). However, if the requested bit stream was not received intact, system 100 resends the requested data (step 532). If data is resent by system 100, it retrieves the data from storage (step 520) and makes it available to the network connection 108 (step 522). From the network connection 108, the data is sent out over the network as was previously done in steps 524 and 526.

Exemplary Operator Interface

Figure 6:
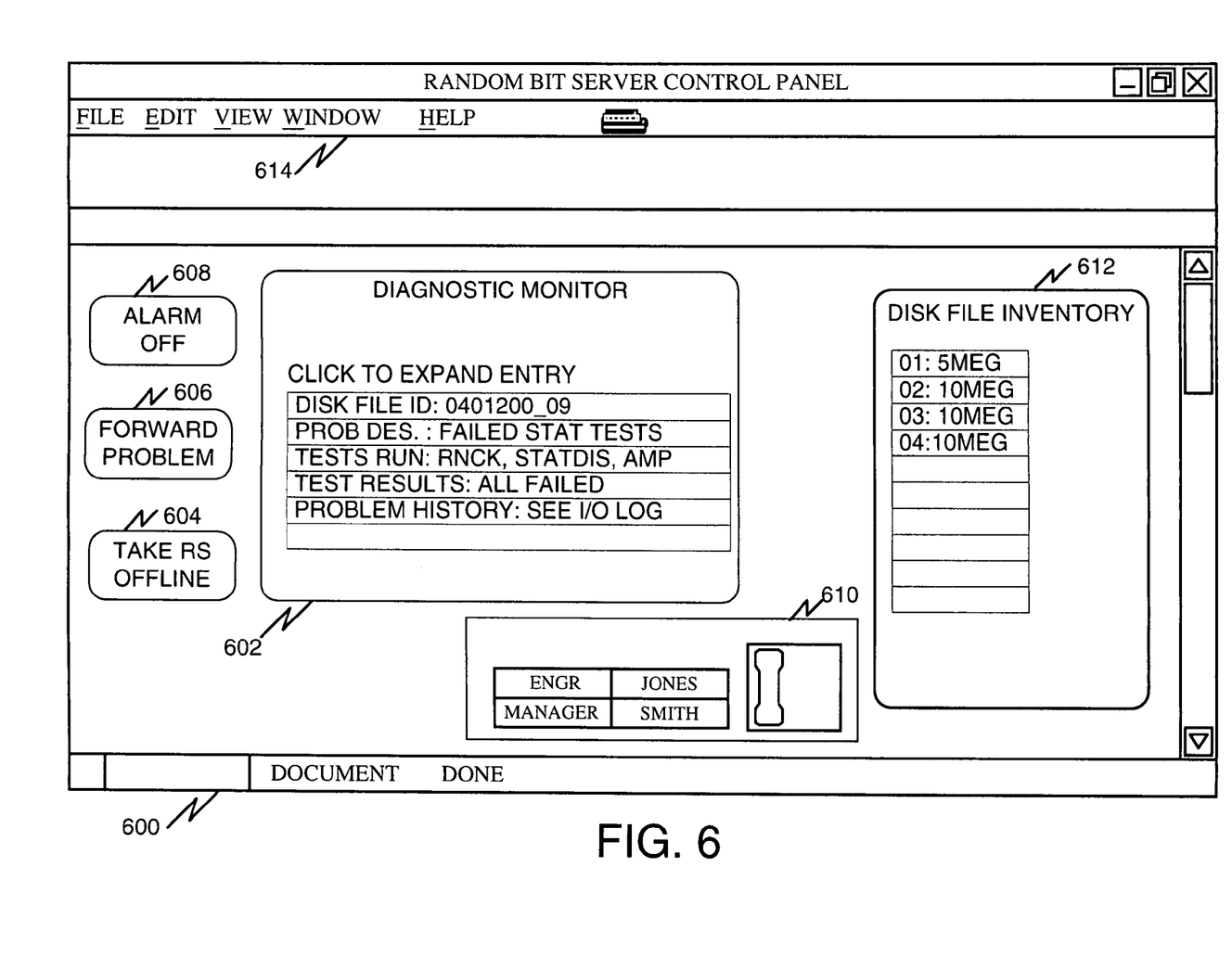
FIG. 6—illustrates an operator interface screen used in conjunction with a random bit server.

FIG. 6 illustrates an operator screen 600 for an embodiment of the disclosed invention wherein the random bit server is comprised of a web server. The web server performs all of the functions necessary to convert inputs from a random source 102 into random bits for distribution to a remote user 114 over network 112. To facilitate proper operation of the random bit server, it is beneficial to employ an operator interface that enables an operator to monitor the operation of the server. Operator screen 600 contains drop down menus 614 in the upper left portion of the screen. Drop down menus 614 provide access to common functions utilized in many software products known in the art, such as file opening, printing, on-line help, and the like. The right portion of operator screen 600 contains a disk file status sub window 612. The disk file status sub window 612 contains information about available disk files containing random bits. The disk file status sub window 612 provides the operator with information regarding the quantity of tested random bits available to users. As a particular disk file is consumed by users, the size of the file decreases. When a disk file is empty it is discarded and the next available disk file is opened.

The left center portion of FIG. 6 contains a diagnostic sub window 602. The diagnostic sub window provides the operator with information regarding disk files containing errors. When system 100 detects a problem with a disk file, the diagnostic sub window 602 is automatically opened. Coincidentally with the opening of the diagnostic sub window 602, an audible alarm sounds to notify the operator of a problem. Using an input device, such as a mouse, to click on the alarm button 608 silences the audible alarm. Diagnostic monitor 602 provides the operator with detailed information about a problem disk file. Clicking on any of the entries in diagnostic sub window 602 opens an additional sub window providing additional detail on the entry. A forward button 606 is provided to allow the operator to quickly forward problem information to previously designated personnel. The list of designated personnel is provided using a listing of email addresses organized such that clicking on the forward button 606 sends the message to all identified recipients.

A telephone sub window 610 provides additional communication features. The telephone sub window 610 allows the operator to call required personnel using a telephone system connected to the operator's computer. The telephone can be implemented inside the computer, or it can reside external to the computer and be interfaced to the computer using a communication cable. If the operator determines that many disk files are corrupted, or if a hardware component in the system is broken, he can click on the take random source offline button 604 to immediately switch operations to another system 100 and random source 102. It will be readily apparent to those skilled in the art that many variations to the operator screen are possible without departing from the spirit of the invention.

A window manager, running in software, is used to control the communication of information to the display device. The window manager controls the layout and the content of the sub windows displayed for the operator. Additionally, the window manager formats data and other information received from processor 106 or memory 110. If desired, the window manager can be configured to perform additional functions such as screen captures for printing or for controlling multiple displays simultaneously. The use of multiple displays provides an operator with the ability to distribute sub windows among displays to make organization and viewing easier.

Exemplary User Interface

Figure 7:
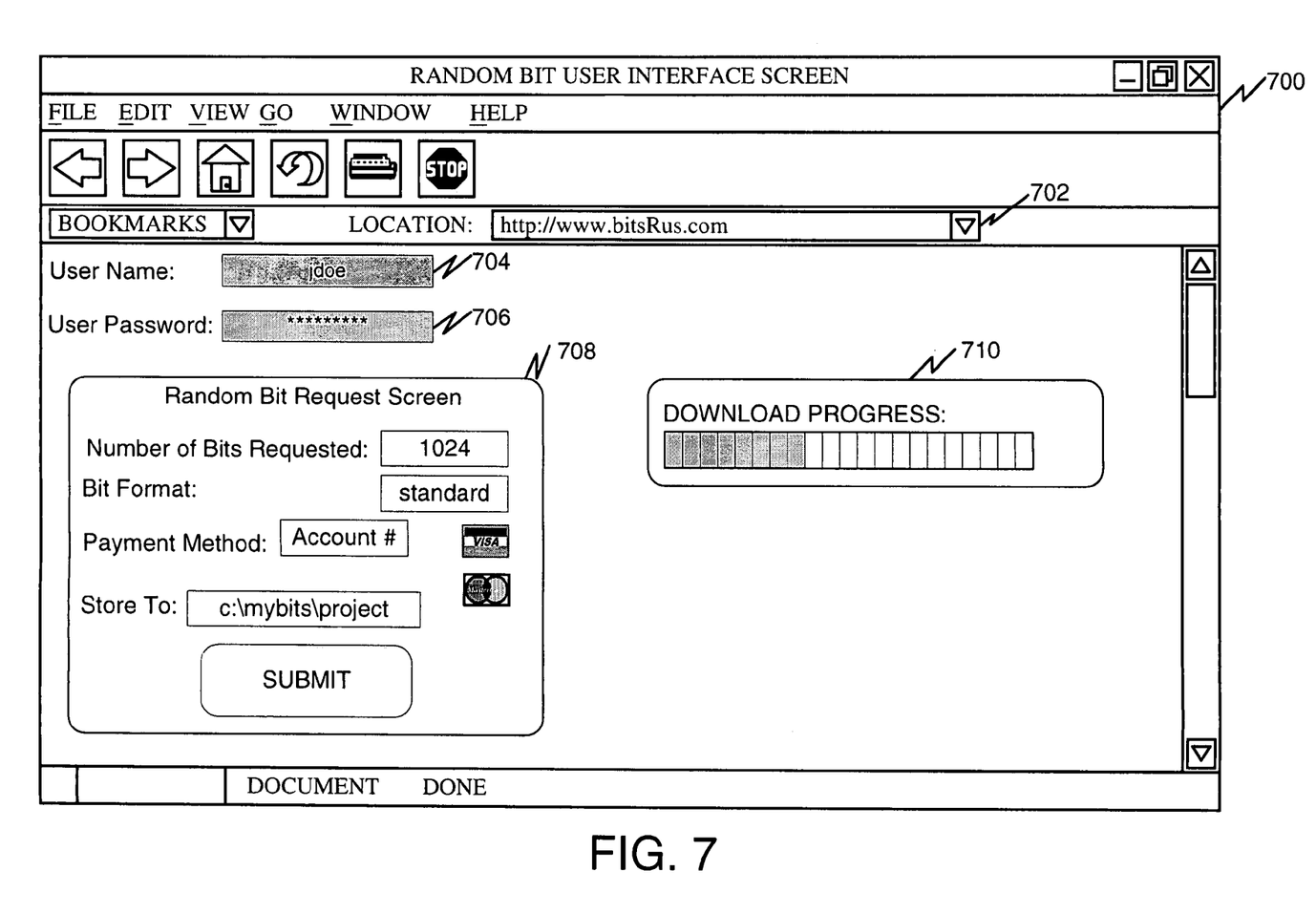
FIG. 7—illustrates a user interface screen used in conjunction with a remote user terminal for receiving machine-readable random bit streams.

FIG. 7 illustrates a representative user interface screen for a customer utilizing a random bit service. The user interface screen 700 is comprised of sub windows and has the general look and layout of a web browser screen. The upper portion of the user interface screen contains a URL window 702. The URL window provides the user with an easy means for reaching a random bit provider using the Internet. The user can type in the URL for the random bit provider or they can utilize a bookmark feature to retrieve a previously stored URL. After going to the URL of a random bit provider, the user is prompted for a user name in the user name sub window 704. Next, a user password is provided in the user password sub window 706. After the user name and password are verified, the user enters additional information necessary for processing the request in the random bit request screen 708.

The random bit request screen 708 first prompts the user for the number of random bits requested. Most random bit servers will be able to provide bit streams of any length. In most situations, it will be the user's application that determines the number of random bits required. Next the user enters the format for the random bits. Normally, there will be a default random bit format associated with a given user's account; however, a user can manually enter the name of any supported format. The user then furnishes the information required for the payment method. In most cases, the user will provide an account number which is verified by the random bit server prior to distributing random bits to the user. If one of the credit card buttons is clicked for the payment method, a pop up window opens and asks for the credit card number, card holder's name, and the expiration date for the card.

When the user enters the credit card information, it is saved. If the user subsequently clicks on the credit card button, the saved information will be retrieved and the user can choose to use the archived information or provide new information. The final piece of information required is the directory path name for storing the random bit stream. The path name information is saved when entered, and subsequent requests by the user will be saved to the selected directory unless the user enters a new path name. When all of the required information has been entered, the user clicks on the submit button and the request is processed by the random bit server. If the user has a valid account or the credit card information is accepted, then the requested number of random bits are sent to the user's computer and stored in the specified location. A download progress sub window 710 opens as the download of random bits begins. The download progress sub window 710 provides the user with a means for monitoring the progress of the download and storage of random bits onto the remote user terminal 114.

It will be readily obvious to those skilled in the art that many variations can be made to the user interface screen without departing from the spirit of the disclosed invention. For example, the user interface screen can be configured such that some of the sub windows illustrated in FIG. 7 are combined. In addition, other types of information can be incorporated into the display layout to aid the user. On line help, frequently asked questions, and on line chat sessions with technical support personnel are examples of additional features that can be added as needed. The displayed information is controlled using a window manager, which is run on the remote user terminal 114. The window manager controls the content and layout of the sub windows displayed on the remote user's system. The use of a window manager makes it easy to change the displayed content as system enhancements are made to the random bit server or as user needs evolve.

SUMMARY

The disclosed invention provides remote users with a reliable and cost effective source of random bits. Reliability is achieved because a truly random physical process is used as a source. Cost effective distribution is achieved because each user does not have to setup and maintain a complex system for generating random bits. Another advantage of the disclosed invention, is that it facilitates secure communications and scientific collaboration because all participants have access to the same truly random seeds, or alternatively, the system can ensure that each user receives a unique random number. The invention also provides a flexible random bit generation and distribution solution that is scalable to meet varying usage demands. In addition, the system contains additional features such as accounting operations, billing systems, error-checking, operator interface, user interface, etc. which facilitate methods of doing business incorporating random bits.

Those skilled in the art will recognize that many variations of the disclosed embodiments are possible. For example, other types of sources can be used to generate truly random, or pseudo random, values. Additionally, random bits can be distributed using non-network means. Loading random bits onto a portable storage media and transporting them to a remote computer exemplifies non-network distribution of random bits. Specially built random bit servers can be constructed and used in place of the specially configured general purpose computers heretofore discussed. Additionally, many variations of the user and operator interface screens are possible. The scope of the disclosed invention is defined by the appended claims, below.

What is claimed is:

1. A system having a random source adaptable for distributing a random bit stream over a network, said system comprising:
   an input interface coupled to the random source for receiving a random data stream from the random source and outputting the random bit stream;
   a processor for receiving the random bit stream from the input interface and outputting the random bit stream in a machine readable form;
   a plurality of disk files for saving random bits output from the processor;
   a memory coupled to the processor for storing machine readable instructions used by the processor for formatting the random bit stream into a machine readable form;
   a network connection coupled to the processor for making the random bit stream available to a network; and
   a download task executed by the processor for providing to a user a number of random bits requested by the user.

2. The system according to claim 1, wherein the input interface includes an analog-to digital converter for converting the random source data into a digital signal.

3. The system according to claim 1, wherein the processor for receiving the random bit stream comprises:
   a first processor; and
   a second processor communicatively coupled to said first processor.

4. The system according to claim 3, wherein the first processor and second processor share said memory.

5. The system according to claim 1, wherein the network connection communicates with an Internet protocol network.

6. The system according to claim 1, wherein the network connection communicates with a wireless network.

7. The system according to claim 1, wherein the memory stores accounting information about the random bit stream.

8. A method for generating random bits as a function of a random source and distributing the random bits over a network, the method comprising the steps of:
   collecting random data from a random source;
   processing the random data to produce a random bit stream in a machine readable form;
   saving the random bits in a plurality of disk files;
   providing the random bits to a network connection; and
   transmitting a number of random bits requested by a user over the network.

9. The method of claim 8, further comprising the step of: generating random data.

10. The method of claim 8, further comprising the step of: receiving a random bit stream at a user location on the network.

11. The method of claim 8, further comprising the step of: validating a user account prior to transmitting the random bits over the network.

12. A distributed system for the production and distribution of random bits, the distributed system comprising:
   a first random number source generating a first random data stream;
   a second random number source generating a second random data stream;
   an interface to the first random number source for receiving the first random data stream and the second random data stream, the interface outputting a random bit stream;

a processor for receiving the random bit stream from the interface, and for formatting the random bit stream for distribution in a machine readable form;

a network connection coupled to the processor for making the machine readable random bit stream available to a network; and a memory coupled to the processor for storing machine readable instructions used by the processor to format the random bit stream for distribution to the network connection in response to a user request for a number of the random bits.

13. A computer readable medium containing instructions for controlling at least one machine to perform a method for distributing random bits to a remote user, the method comprising the steps of:

converting a random data stream into a machine readable random bit stream;

saving the random bits to a plurality of disk files;

providing the machine readable random bit stream to a network connection; and transmitting a number of random bits requested by a user in the machine readable random bit stream over a network.

14. A method for producing a random bit stream from a random source and offering the random bit stream to a remote user, the method comprising the steps of:

processing the random bit stream to form a distributable random bit stream;

making the distributable random bit stream available to a remote user from at least one of a plurality disk files; and transmitting to the user over a network a number of random bits requested by the user.

15. The method of claim 14, further comprising the step of:

processing the random bit stream to ensure that successive bits are unbiased.

16. The method of claim 14, further comprising the step of:

performing accounting operations on the random bit stream to ensure that the remote user is billed for the received random bit stream.

17. The method of claim 14, further comprising the step of:

authorizing the remote user to receive the random bit stream prior to distributing the distributable random bit stream to the remote user.

18. The method of claim 14, further comprising the step of:

confirming that the remote user has received the distributable random bit stream.

19. The method of claim 14, further comprising the step of:

encapsulating the random bit stream.

* * * * *